(12) United States Patent
Liu et al.

(10) Patent No.: US 10,880,795 B2
(45) Date of Patent: Dec. 29, 2020

(54) METHOD FOR HANDOVER BETWEEN ACCESS POINTS, AND TERMINAL EQUIPMENT

(71) Applicant: Huawei Technologies Co., Ltd., Shenzhen (CN)

(72) Inventors: Weiqiang Liu, Shanghai (CN); Tongbo Wang, Shanghai (CN); Jiang Chen, Shanghai (CN); Yun Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 21 days.

(21) Appl. No.: 16/305,824

(22) PCT Filed: May 31, 2016

(86) PCT No.: PCT/CN2016/084136
§ 371 (c)(1),
(2) Date: Nov. 29, 2018

(87) PCT Pub. No.: WO2017/206067
PCT Pub. Date: Dec. 7, 2017

(65) Prior Publication Data
US 2020/0154322 A1 May 14, 2020

(51) Int. Cl.
*H04W 4/00* (2018.01)
*H04W 36/00* (2009.01)
(Continued)

(52) U.S. Cl.
CPC ....... *H04W 36/0072* (2013.01); *H04W 36/06* (2013.01); *H04W 36/08* (2013.01); *H04W 76/11* (2018.02); *H04W 80/02* (2013.01)

(58) Field of Classification Search
CPC .............. H04W 4/70; H04W 36/0011; H04W 36/0016; H04W 36/06; H04W 36/0083;
(Continued)

(56) References Cited

U.S. PATENT DOCUMENTS 8,488,486 B2 7/2013 Ikeda et al.
9,048,984 B2 6/2015 Yao et al.
(Continued)

FOREIGN PATENT DOCUMENTS

CN 1549530 A 11/2004
CN 1720756 A 1/2006
(Continued)

OTHER PUBLICATIONS

Shah, Zawar et al., "Throughput Comparison of IEEE 802.11ac and IEEE 802.11n in an Indoor Environment with Interference," 2015 International Telecommunication Networks and Applications Conference (ITNAC), Nov. 2015, pp. 196-201.
(Continued)

*Primary Examiner* — Frank Duong
(74) *Attorney, Agent, or Firm* — Slater Matsil, LLP

(57) ABSTRACT

The present invention provides a method for handover between access points, and terminal equipment. The method includes: when performing information transmission with a first access point AP on a first frequency band, determining whether the terminal equipment needs to establish a connection with a second AP which is a second frequency band; determining, by the terminal equipment, whether the first AP and the second AP are corresponding to a same dual-band radio access device; sending, by the terminal equipment, a connection request to the second AP when maintaining a protocol layer connection with the first AP; and establishing, by the terminal equipment, the connection with the second AP when the second AP send feedback. In the method,
(Continued)

duration required by a process of handover between access points can be reduced, and a user is made not perceive the handover process, thereby improving user experience.

20 Claims, 4 Drawing Sheets

(51) Int. Cl.
*H04W 76/11* (2018.01)
*H04W 36/06* (2009.01)
*H04W 36/08* (2009.01)
*H04W 80/02* (2009.01)

(58) Field of Classification Search
CPC ..... H04W 36/08; H04W 36/14; H04W 36/16; H04W 36/18; H04W 48/20; H04W 72/04; H04W 72/0426; H04W 84/12; H04W 88/06; H04W 88/16
See application file for complete search history.

(56) References Cited

U.S. PATENT DOCUMENTS

| | | | |
|---|---|---|---|
| 2006/0073827 A1 | 4/2006 | Vaisanen et al. | |
| 2006/0268765 A1 | 11/2006 | Bajic et al. | |
| 2006/0268799 A1 | 11/2006 | Huang et al. | |
| 2008/0069065 A1* | 3/2008 | Wu | H04W 36/08 370/340 |
| 2010/0260146 A1 | 10/2010 | Lu | |
| 2010/0332822 A1 | 12/2010 | Liu et al. | |
| 2011/0013591 A1 | 1/2011 | Kakumaru | |
| 2012/0281544 A1* | 11/2012 | Anepu | H04B 7/024 370/241 |
| 2013/0150012 A1 | 6/2013 | Chhabra et al. | |
| 2013/0215863 A1 | 8/2013 | Sun et al. | |
| 2013/0308600 A1 | 11/2013 | Bharghavan et al. | |
| 2014/0003394 A1* | 1/2014 | Rubin | H04B 17/382 370/331 |
| 2014/0022902 A1 | 1/2014 | Uppunda et al. | |
| 2015/0079945 A1* | 3/2015 | Rubin | H04L 1/0027 455/411 |
| 2015/0207578 A1 | 7/2015 | Ramamurthy et al. | |
| 2015/0256323 A1 | 9/2015 | Gandarillas Diego et al. | |
| 2015/0382348 A1 | 12/2015 | Hara | |
| 2016/0128106 A1* | 5/2016 | Ren | H04W 48/18 370/338 |
| 2017/0019785 A1 | 1/2017 | Liu et al. | |
| 2017/0034839 A1* | 2/2017 | Rubin | H04W 28/0215 |

FOREIGN PATENT DOCUMENTS

| | | |
|---|---|---|
| CN | 1729651 A | 2/2006 |
| CN | 101218796 A | 7/2008 |
| CN | 101257429 A | 9/2008 |
| CN | 101765170 A | 6/2010 |
| CN | 102461329 A | 5/2012 |
| CN | 103561449 A | 2/2014 |
| CN | 103891379 A | 6/2014 |
| CN | 104640166 A | 5/2015 |
| CN | 104797011 A | 7/2015 |
| CN | 105210448 A | 12/2015 |
| EP | 2901809 A1 | 8/2015 |
| EP | 3016443 B1 | 12/2017 |
| JP | 2012531817 A | 12/2012 |
| JP | 2015505188 A | 2/2015 |
| JP | 2015162861 A | 9/2015 |
| JP | 2016012900 A | 1/2016 |
| JP | 2016540470 A | 12/2016 |
| KR | 20130119123 A | 10/2013 |
| WO | 2009090953 A1 | 7/2009 |
| WO | 2015047884 A1 | 4/2015 |

OTHER PUBLICATIONS

Guo, Y., "Wireless Mesh Network Construction and Performance Test Based on 802.11", Beijing University of Posts and Telecommunications School of Automation 100876, Dec. 28, 6 pages.

Xudong, H. et al., "Performance Research and Latest Development of IEEE 802.11 Wireless LAN", Communications Today, Aug. 15, 2003, 7 pages.

\* cited by examiner

METHOD FOR HANDOVER BETWEEN ACCESS POINTS, AND TERMINAL EQUIPMENT

CROSS-REFERENCE TO RELATED APPLICATIONS

This application is a national stage of International Application No. PCT/CN2016/084136, filed on May 31, 2016, which application is hereby incorporated herein by reference.

TECHNICAL FIELD

Embodiments of the present invention relate to the communications field, and more specifically, to a method for handover between access points, and terminal equipment.

BACKGROUND

A Wireless Fidelity ("WiFi" for short) technology is a generic term for technologies that are based on the IEEE 802.11 protocol family and support local area wireless network communication. A system mainly includes a client (Station, "STA" for short) and an access point ("AP" for short). The STA and the AP perform communication by using an air interface, that is, by means of wireless transmission. The AP connects the STA to a local area network of the Internet, so that the STA can access the Internet.

Currently, application of a dual-band AP is becoming increasingly popular. The dual-band AP can simultaneously operate on 2.4 G and 5 G frequency bands. However, currently, most STAs do not support operating on dual bands. That is, a STA cannot simultaneously operate on the 2.4 G and 5 G frequency bands. For example, once accessing a 2.4 G AP, the STA can operate only on the 2.4 G frequency band, and cannot use the 5 G frequency band for data transmission. Therefore, a method for handover between access points needs to be used to hand over the STA to an AP that exists in a desirable channel status.

An existing method for handover between access points includes first disconnecting a STA from a current AP and then connecting the STA to a new AP. Duration required by a handover process in this method is relatively long, and a data service in use is interrupted, affecting user experience. Therefore, a method for handover between access points needs to be provided to reduce duration required by a handover process and improve user experience.

SUMMARY

This application provides a method for handover between access points, and terminal equipment, so as to reduce duration required by a handover process, and make a user not perceive the handover process, thereby improving user experience.

According to a first aspect, a method for handover between access points is provided, including: when terminal equipment performs information transmission with a first access point ("AP" for short) on a first frequency band, determining, by the terminal equipment, whether the terminal equipment needs to establish a connection with a second AP, where an operating frequency band of the second AP is a second frequency band; when the terminal equipment determines that the terminal equipment needs to establish the connection with the second AP, determining, by the terminal equipment, whether the first AP and the second AP are corresponding to a same dual-band radio access device; when the terminal equipment determines that the first AP and the second AP are corresponding to the same dual-band radio access device, sending, by the terminal equipment, a connection request to the second AP when maintaining a protocol layer connection with the first AP, where the connection request is used to request to establish a connection with the second AP; and if the terminal equipment receives a success message that is fed back according to the connection request and that is sent by the second AP, establishing, by the terminal equipment, the connection with the second AP.

It can be understood that the protocol layer connection between the terminal equipment and the first AP is a Transmission Control Protocol ("TCP" for short)/Internet Protocol "IP" for short) connection between the terminal equipment and the first AP. The first AP is an AP to which the terminal equipment is currently connected, and the first AP may be referred to as an original AP. The second AP is an AP to which the terminal equipment is to be handed over, and the second AP may be referred to as a target AP.

Therefore, in the method for handover between access points in this application, when the terminal equipment determines that the original AP and the target AP are corresponding to the same dual-band radio access device, the terminal equipment may establish the connection with the target AP when maintaining the protocol layer connection with the original AP. In this case, during a process of handing over terminal equipment to an access point, an IP connection of an upper-layer application of a user is not removed, so that the user does not perceive the handover process. In addition, when the terminal equipment establishes the connection with the target AP, the target AP does not need to assign an IP address to the terminal equipment, so as to reduce duration required by the handover process, thereby improving user experience.

Optionally, when the terminal equipment determines that the terminal equipment needs to establish the connection with the second AP, the terminal equipment determines whether service set identifiers ("SSID" for short) and passwords of the first AP and the second AP are the same. When the terminal equipment determines that the SSIDs and/or the passwords of the first AP and the second AP are different, the terminal equipment determines whether the first AP and the second AP share a same Dynamic Host Configuration Protocol ("DHCP" for short) server. When the terminal equipment determines that the first AP and the second AP share the same DHCP server, the terminal equipment sends a connection request to the second AP when maintaining a TCP/IP connection with the first AP, where the connection request is used to request to establish a connection with the second AP. If the terminal equipment receives a success message that is fed back according to the connection request and that is sent by the second AP, the terminal equipment establishes the connection with the second AP.

Therefore, even if the SSIDs and/or the passwords of the first AP and the second AP are different, as long as the first AP and the second AP share the same DHCP server, the terminal equipment can establish the connection with the target AP when maintaining the TCP/IP connection with the original AP. In this case, during a process of handing over terminal equipment to an access point, an IP connection of an upper-layer application of a user is not removed, so that the user does not perceive the handover process. In addition, when establishing the connection with the target AP, the terminal equipment does not need to re-apply for an IP address from the second AP, so as to reduce duration required by the handover process, thereby improving user experience.

With reference to the first aspect, in a first possible implementation of the first aspect, the determining, by the terminal equipment, whether the first AP and the second AP are corresponding to a same dual-band radio access device includes: determining, by the terminal equipment according to a relationship between a basic service set identifier ("BSSID" for short) of the first AP and a BSSID of the second AP, whether the first AP and the second AP are corresponding to the same dual-band radio access device; or determining, by the terminal equipment according to a relationship between a Media Access Control ("MAC" for short) address of a default gateway of the first AP and a MAC address of a default gateway of the second AP, whether the first AP and the second AP are corresponding to the same dual-band radio access device.

With reference to the first aspect or the first possible implementation of the first aspect, in a second possible implementation of the first aspect, the determining, by the terminal equipment, whether the terminal equipment needs to establish a connection with a second AP includes: scanning, by the terminal equipment, channels on the first frequency band and the second frequency band; and determining, by the terminal equipment according to a result of scanning the channels on the first frequency band and the second frequency band, whether the terminal equipment needs to establish the connection with the second AP.

During a channel scanning process, the terminal equipment may obtain received signal strength indicators ("RSSI" for short) that are corresponding to different APs, and the terminal equipment may determine, according to the RSSIs that are corresponding to the different APs, whether handover between access points is required.

With reference to the second possible implementation of the first aspect, in a third possible implementation of the first aspect, the scanning, by the terminal equipment, channels on the first frequency band and the second frequency band includes: scanning, by the terminal equipment, any channel of the channels on the first frequency band and the second frequency band; when the terminal equipment completes scanning of the any channel, determining, by the terminal equipment, whether there is to-be-sent data; when the terminal equipment determines that there is to-be-sent data, sending, by the terminal equipment, the to-be-sent data by using the first frequency band; and after the terminal equipment sends the to-be-sent data by using the first frequency band, continuing scanning, by the terminal equipment, another channel of the channels on the first frequency band and the second frequency band.

In other words, the terminal equipment may perform channel scanning in a background scanning manner. This can ensure that during a channel scanning process, the terminal equipment and the original AP can perform data exchange without causing stream interruption on the terminal equipment. Therefore, user experience can be improved.

With reference to the second or the third possible implementation of the first aspect, in a fourth possible implementation of the first aspect, the method further includes: determining, by the terminal equipment, a first channel and a second channel, where the first channel is an operating channel of the first AP on the first frequency band, and the second channel is an operating channel of the second AP on the second frequency band; and the scanning, by the terminal equipment, channels on the first frequency band and the second frequency band includes: scanning, by the terminal equipment, the first channel and the second channel.

In other words, when performing channel scanning, the terminal equipment may scan only operating channels of the original AP and the target AP, and determine, according to a result of scanning the operating channels of the original AP and the target AP, whether handover between access points is required.

Therefore, the terminal equipment needs to scan only two channels instead of scanning all channels, so that time overheads of channel scanning can be reduced, thereby reducing time required by a handover process and improving user experience.

With reference to the fourth possible implementation of the first aspect, in a fifth possible implementation of the first aspect, before the determining, by the terminal equipment, whether the terminal equipment needs to establish a connection with a second AP, the method further includes: storing, by the terminal equipment, a first network configuration of the first AP and a second network configuration of the second AP, where the first network configuration includes the first channel, and the second network configuration includes the second channel; and the determining, by the terminal equipment, a first channel and a second channel includes: determining, by the terminal equipment, the first channel according to the first network configuration; and determining, by the terminal equipment, the second channel according to the second network configuration.

Optionally, when the terminal equipment previously establishes connections with the first AP and the second AP, the terminal equipment stores a network configuration of the first AP and a network configuration of the second AP, where the network configuration of the first AP may also include the SSID and/or the password of the first AP in addition to the operating channel of the first AP, and the network configuration of the second AP may also include the SSID and/or the password of the second AP in addition to the operating channel of the second AP. By querying the stored network configurations, the terminal equipment can learn the operating channels of the first AP and the second AP in advance, so that scanning is performed only on the operating channels of the first AP and the second AP during channel scanning. Therefore, time overheads of scanning can be reduced.

With reference to any one of the first aspect or the first to the fifth possible implementations of the first aspect, in a sixth possible implementation of the first aspect, the sending a connection request to the second AP includes: sending a reassociation request frame to the second AP, where the reassociation request frame carries the BSSID of the first AP.

Therefore, on a network, a data packet sent to the original AP can be forwarded to the target AP, so as to reduce a packet loss during a handover process.

With reference to any one of the first aspect or the first to the sixth possible implementations of the first aspect, in a seventh possible implementation of the first aspect, the first frequency band is 2.4 GHz, and the second frequency band is 5 GHz; or the first frequency band is 5 GHz, and the second frequency band is 2.4 GHz.

According to a second aspect, terminal equipment is provided, where the terminal equipment is configured to execute the method in the foregoing first aspect or any possible implementation of the first aspect. Specifically, the terminal equipment includes units configured to execute the method in the foregoing first aspect or any possible implementation of the first aspect.

According to a third aspect, terminal equipment is provided, including a processor, a memory, and a transceiver, where the processor, the memory, and the transceiver are connected by using a bus system, the memory is configured to store an instruction, the transceiver receives and sends a message under control of the processor, to implement communication between the terminal equipment and an AP, and the processor is configured to invoke the instruction stored in the memory, to execute the method in the foregoing first aspect or any possible implementation of the first aspect.

According to a fourth aspect, a computer readable medium is provided, where the computer readable medium is configured to store a computer program, and the computer program includes an instruction used to execute the method in the first aspect or any possible implementation of the first aspect.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

In the embodiments of the present invention, terminal equipment may also be referred to as user equipment ("UE" for short), a mobile station ("MS" for short), a mobile terminal, a client ("STA" for short), or the like. The terminal equipment may communicate with one or more core networks by using a radio access network ("RAN" for short). For example, the terminal equipment may be a mobile phone (or referred to as a "cellular" phone), a computer with a mobile terminal, or the like. For example, the terminal equipment may be a portable, pocket-sized, handheld, computer built-in, or in-vehicle mobile apparatus, terminal equipment in a future 5G network, terminal equipment in a future evolved PLMN network, or the like.

In the embodiments of the present invention, a radio access device is a device with a wireless-to-wired bridging function. A dual-band radio access device is a radio access device that can simultaneously operate on two frequency bands. A current dual-band radio access device can simultaneously operate on a 2.4 GHz frequency band and a 5 GHz frequency band. An access point ("AP" for short), commonly known as a "hotspot", is a workstation that has a basic service set ("BSS" for short) function of managing an infrastructure and that makes terminal equipment access a distributed system. One dual-band radio access device can provide two APs. For example, a dual-band radio access device that simultaneously operates on the 2.4 GHz frequency band and the 5 GHz frequency band can provide a 2.4 GHz AP and a 5 GHz AP.

Figure 1:
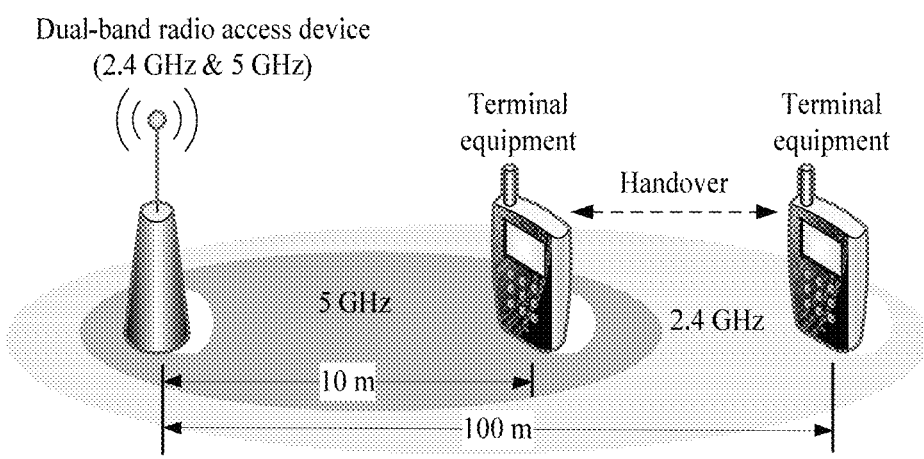
FIG. 1 is a schematic diagram of an application scenario according to an embodiment of the present invention.

FIG. 1 is a schematic diagram of an application scenario according to an embodiment of the present invention. As shown in FIG. 1, a dual-band radio access device can simultaneously operate on a 2.4 GHz frequency band and a 5 GHz frequency band. It can be understood that a 5 GHz signal has advantages of a wide frequency band, low interference, and a high throughput rate. However, a 5 GHz channel has a poor wall-penetration capability. By contrast, a 2.4 GHz signal has a slightly narrow frequency band but has a desirable wall-penetration capability and a wide coverage area.

As a distance between terminal equipment and the dual-band radio access device changes, a frequency band occupied when the terminal equipment and the dual-band radio access device perform information transmission needs to change (it can also be understood that an AP accessed by the terminal equipment changes). As shown in FIG. 1, when the terminal equipment is nearer the dual-band radio access device (for example, within 10 meters), the terminal equipment selects the 5 GHz frequency band (accesses a 5 GHz AP) to perform information transmission with the dual-band radio access device. This can improve a throughput rate under the premise of ensuring communication quality. When the terminal equipment is farther away from the dual-band radio access device (for example, between 10 meters and 100 meters), channel quality gradually becomes deteriorated, and the terminal equipment chooses to be handed over to the 2.4 GHz frequency band (accesses a 2.4 GHz AP) to perform information transmission with the dual-band radio access device, thereby ensuring long-distance coverage of a signal.

On this basis, a method for handover between access points may be provided. Smooth and seamless switching from an original AP to a target AP can be implemented as long as the original AP and the target AP are corresponding to the same dual-band radio access device, so as to avoid a waste of network resources and improve user experience.

The following uses an example in which an encryption manner of a wireless network is Wireless Fidelity Protected Access ("WAP" for short) or WAP2 to describe a method for handover between access points in the embodiments of the present invention. It can be understood that the method for handover between access points in the embodiments of the present invention can also be applied to a scenario in which another encryption manner is used for encryption of a wireless network or a wireless network is not encrypted, for example, a scenario in which a wired equivalent privacy ("WEP" for short) manner or an open manner is used for encryption of the wireless network.

It should be noted that, when a specific embodiment is described, "first" and "second" are used merely for distinguishing between described objects and do not constitute any limitation on the described objects.

Figure 2:
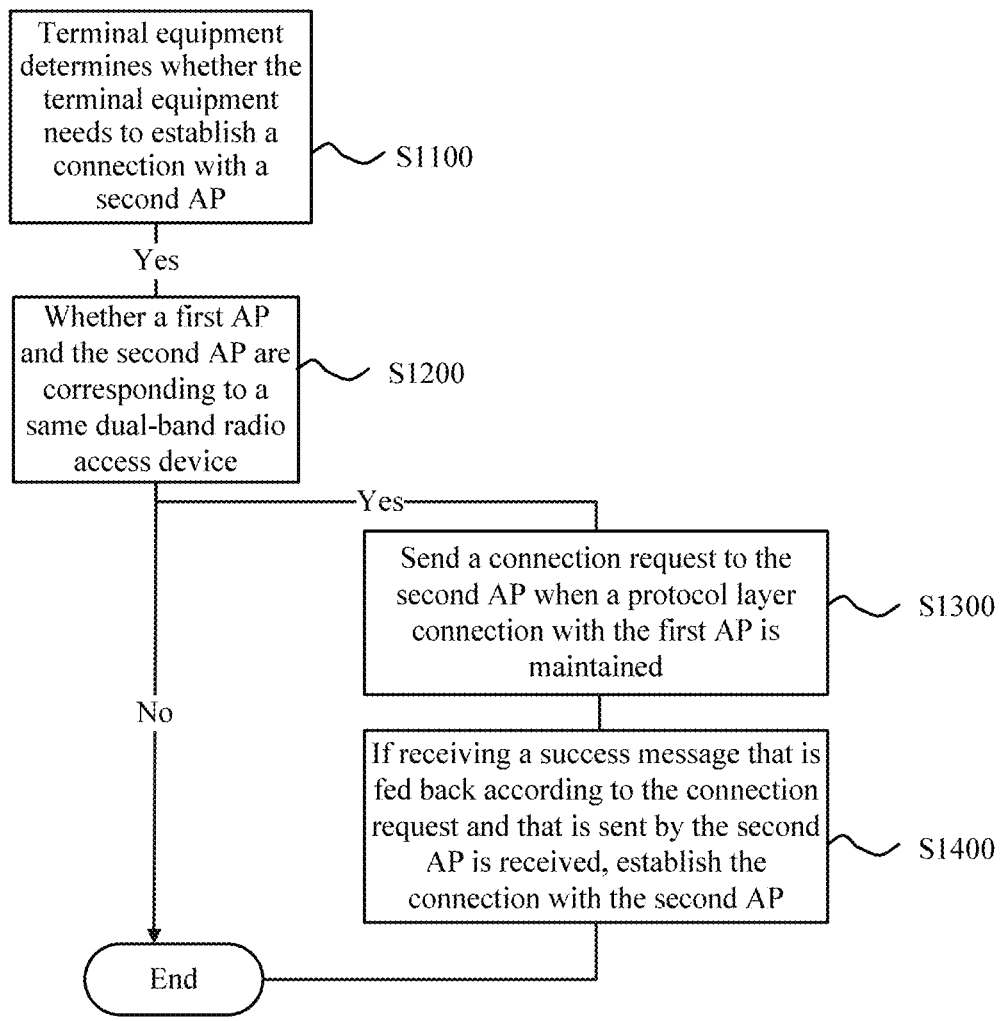
FIG. 2 is a schematic flowchart of a method for handover between access points according to an embodiment of the present invention.

FIG. 2 is a schematic flowchart of a method for handover between access points according to an embodiment of the present invention. As shown in FIG. 2, a method 1000 includes the following steps.

S1100: When terminal equipment performs information transmission with a first access point AP on a first frequency band, the terminal equipment determines whether the terminal equipment needs to establish a connection with a second AP, where an operating frequency band of the second AP is a second frequency band.

It can be understood that, that the terminal equipment performs information transmission with the first AP on the first frequency band indicates that the first frequency band is an operating frequency band of the first AP.

Optionally, for example, when the terminal equipment performs information transmission with the first AP on the first frequency band, the terminal equipment scans channels on the first frequency band and the second frequency band. Each operating frequency band is corresponding to one or more channels. The terminal equipment determines, according to a channel scanning result, whether the terminal equipment needs to establish the connection with the second AP. For example, the first frequency band is 2.4 GHz, and the second frequency band is 5 GHz; or the first frequency band is 5 GHz, and the second frequency band is 2.4 GHz. The 2.4 GHz frequency band is corresponding to 13 channels, and the 5 GHz frequency band is corresponding to five channels.

Specifically, during a process in which the terminal equipment performs channel scanning, the terminal equipment may obtain information about an AP that is around the terminal equipment. The information about the AP includes an SSID, a basic service set identifier ("BSSID" for short), an operating channel, and a bandwidth of the AP, a received signal strength indicator ("RSSI" for short) corresponding to the AP, and other information. The terminal equipment determines, according to the information about the AP, whether handover between access points is required.

Optionally, for example, during channel scanning by the terminal equipment, the terminal equipment uses a background scanning manner to perform channel scanning. Specifically, the terminal equipment chooses to scan any channel on the first frequency band and the second frequency band. After completing scanning of the channel, the terminal equipment switches to the operating channel of the first AP to detect whether the terminal equipment is to receive or to send data. If the terminal equipment is to send buffered data, the terminal equipment sends the buffered data on the operating channel of the first AP, or if the terminal equipment is to receive data, the terminal equipment receives the to-be-received data on the operating channel of the first AP, and then switches to a next channel for scanning. Therefore, it is ensured that stream interruption does not occur on the terminal equipment during the channel scanning process. During channel scanning, the terminal equipment may choose to scan all of the 13 channels on the 2.4 GHz frequency band and the five channels on the 5 GHz frequency band.

Further, the terminal equipment may further determine the operating channel of the first AP and an operating channel of the second AP before performing channel scanning, so that during channel scanning, the terminal equipment scans only two channels, that is, the operating channel of the first AP and the operating channel of the second AP. This reduces time consumed by channel scanning.

Optionally, when the terminal equipment previously establishes connections with the first AP and the second AP, the terminal equipment stores a network configuration of the first AP and a network configuration of the second AP, where the network configuration of the first AP includes the operating channel of the first AP, and the network configuration of the second AP includes the operating channel of the second AP. Therefore, only by querying the network configurations stored by the terminal equipment, the terminal equipment can determine the operating channels of the first AP and the second AP.

Alternatively, the terminal equipment may receive a network configuration of the first AP and a network configuration the second AP by establishing device-to-device ("D2D" for short) communication with another terminal equipment. The network configurations of the first AP and the second AP are stored by the another terminal equipment when the another terminal equipment establishes connections with the first AP and the second AP, and are sent by the another terminal equipment.

Alternatively, the terminal equipment may receive, by performing interaction with a cloud server, a network configuration of the first AP and a network configuration of the second AP that are delivered by the cloud server.

It can be understood that the network configuration of the first AP may also include an SSID and/or a password of the first AP in addition to the operating channel of the first AP, and the network configuration of the second AP may also include an SSID and/or a password of the second AP in addition to the operating channel of the second AP.

S1200: When the terminal equipment determines that the terminal equipment needs to establish the connection with the second AP, the terminal equipment determines whether the first AP and the second AP are corresponding to a same dual-band radio access device.

Specifically, the terminal equipment determines, according to a relationship between a BSSID of the first AP and a BSSID of the second AP, whether the first AP and the second AP are corresponding to the same dual-band radio access device. When the first 16 bits of the BSSID of the first AP and the first 16 bits of the BSSID of the second AP are the same, the terminal equipment determines that the first AP and the second AP are corresponding to the same dual-band radio access device. Alternatively, the terminal equipment determines, according to a relationship between a Media Access Control ("MAC" for short) address of a default gateway of the first AP and a MAC address of a default gateway of the second AP, whether the first AP and the second AP are corresponding to the same dual-band radio access device. If the MAC address of the default gateway of the first AP and the MAC address of the default gateway of the second AP are the same, the terminal equipment determines that the first AP and the second AP are corresponding to the same dual-band radio access device. A method for determining whether the first AP and the second AP are corresponding to the same dual-band radio access device is not limited herein.

S1300: When the terminal equipment determines that the first AP and the second AP are corresponding to the same dual-band radio access device, the terminal equipment sends a connection request to the second AP when maintaining a protocol layer connection with the first AP, where the connection request is used to request to establish a connection with the second AP.

The protocol layer connection between the terminal equipment and the first AP is a Transmission Control Protocol ("TCP" for short)/Internet Protocol ("IP" for short) connection between the terminal equipment and the first AP.

S1400: If the terminal equipment receives a success message that is fed back according to the connection request and that is sent by the second AP, the terminal equipment establishes the connection with the second AP.

The terminal equipment sends the connection request to the second AP when maintaining the TCP/IP connection with the first AP, indicating that the terminal equipment is disconnected from the first AP on a physical channel, switches to the operating channel of the second AP to send the connection request to the second AP, and establishes the connection with the second AP when receiving positive feedback from the second AP on the operating channel of the second AP. In this case, during a process of handing over terminal equipment to an access point, the terminal equipment removes only a physical layer connection with the first AP, and does not remove the protocol layer connection with the first AP. Therefore, an upper-layer application service of a user is not terminated, and the user does not perceive the handover process, and user experience is improved.

For example, assuming that a user is performing video communication with another user by using WeChat, if the terminal equipment establishes the connection with the second AP when maintaining the TCP/IP connection with the first AP, a user interface ("UI" for short) of the terminal equipment stalls for a short moment, but a video interface on the UI is not automatically interrupted, and the user does not need to restart to initiate a video connection. In this case, the user does not perceive the handover process, and user experience is improved.

In addition, the terminal equipment maintains the TCP/IP connection with the first AP, and the terminal equipment stores an IP address that is assigned by the first AP to the terminal equipment. Because the first AP and the second AP are corresponding to the same dual-band radio access device, the first AP and the second AP share a same Dynamic Host Configuration Protocol ("DHCP" for short) server. Therefore, when the terminal equipment establishes the connection with the second AP, the terminal equipment does not need to apply for an IP address from the second AP, reducing time consumed by the handover process.

Optionally, for example, after establishing the connection with the second AP, the terminal equipment may release the TCP/IP connection with the first AP. In this case, network resources can be saved.

Figure 3:
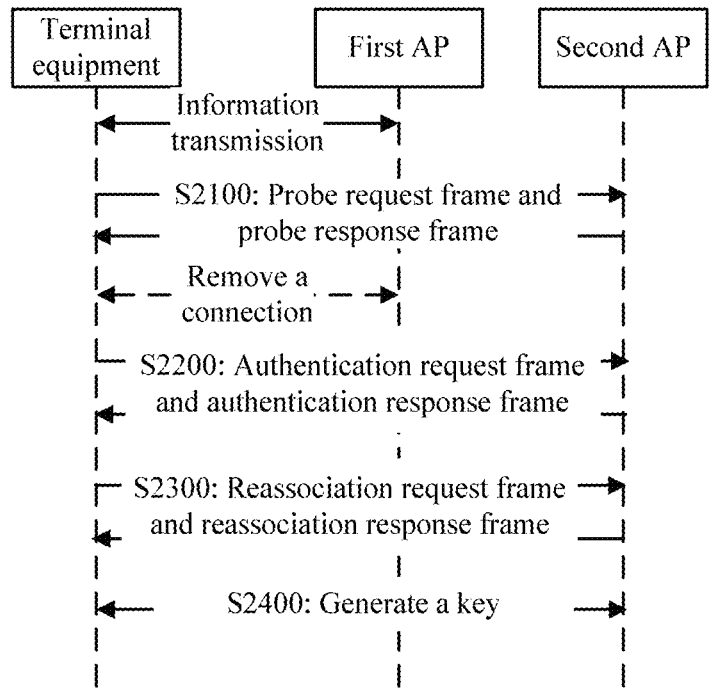
FIG. 3 is a schematic flowchart of a method for handover between access points according to another embodiment of the present invention.

FIG. 3 is a schematic flowchart of a method for handover between access points according to a specific embodiment of the present invention. As shown in FIG. 3, a method 2000 includes the following steps.

S2100: Terminal equipment sends a probe request frame and receives a probe response frame sent by a second AP.

A first AP and the second AP in FIG. 3 are corresponding to a same dual-band radio access device. The terminal equipment currently establishes a connection and performs communication with the first AP. The terminal equipment performs channel scanning by sending the Probe Request frame and receiving the Probe Response frame sent by the AP. The terminal equipment may specifically use a manner in S1100 of the method 1000 to perform channel scanning. To avoid repetition, details are not described herein again.

The Probe Response frame includes information about the second AP. The terminal equipment determines, according to the information about the second AP in the Probe Response frame, whether handover between access points is required.

For example, when the terminal equipment determines, according to the received Probe Response frame from the second AP, that an RSSI value corresponding to the second AP is greater than an RSSI value corresponding to the first AP, the terminal equipment determines that the terminal equipment needs to establish a connection with the second AP. When the terminal equipment determines, according to the received Probe Response frame, that the RSSI value corresponding to the first AP is greater than an RSSI value corresponding to another AP, the terminal equipment determines that the terminal equipment does not need to be handed over to an access point but still maintains the connection with the first AP.

In S2100, the terminal equipment may send the Probe Request frame in a broadcast mode, or may send the Probe Request frame to the second AP in a unicast mode. This is not limited in this embodiment of the present invention.

Optionally, for example, in S2100, the terminal equipment may determine, by using the information about the second AP in a received beacon frame (Beacon) sent by the second AP, whether the terminal equipment needs to establish the connection with the second AP. For example, the terminal equipment receives multiple Beacon frames, and each Beacon frame is corresponding to one AP. If an RSSI value that is in a Beacon frame and that is corresponding to the second AP is greater than an RSSI value that is in the Beacon frame and that is corresponding to another AP, the terminal equipment determines that the terminal equipment needs to establish the connection with the second AP.

Specifically, a method in which the terminal equipment determines, according to the information about the second AP, whether handover between access points is required is as follows:

First, the terminal equipment determines whether an SSID and a password of the first AP and an SSID and a password of the second AP are the same, and whether the RSSI value corresponding to the second AP is greater than the RSSI value corresponding to the first AP.

If the SSIDs and the passwords of the first AP and the second AP are the same and the RSSI value corresponding to the second AP is greater than the RSSI value corresponding to the first AP, it indicates that the first AP and the second AP are two APs on a same local area network, and a roaming mechanism in the prior art can be directly started to hand over the terminal equipment from the first AP to the second AP by means of roaming.

If the RSSI value corresponding to the second AP is greater than the RSSI value corresponding to the first AP but the SSIDs and/or the passwords of the first AP and the second AP are different, the terminal equipment further determines whether the first AP and the second AP are corresponding to the same dual-band radio access device. For a method for determining whether the first AP and the second AP are corresponding to the same dual-band radio access device, reference may be made to the foregoing embodiment, and details are not described herein again.

If the terminal equipment determines that the first AP and the second AP are corresponding to the same dual-band radio access device and that the RSSI value corresponding to the second AP is greater than the RSSI value corresponding to the first AP, step S2200 is performed.

S2200: The terminal equipment sends an authentication request (Authentication Request) frame to the second AP and receives an authentication response (Authentication Response) frame sent by the second AP.

S2300: If the Authentication Response frame acknowledges that identity authentication of the terminal equipment succeeds, the terminal equipment sends a reassociation request (ReAssociation Request) frame to the second AP, and receives a reassociation response (ReAssociation Response) frame sent by the second AP. If the ReAssociation Response frame acknowledges that the second AP accepts an association request of the terminal equipment, the terminal equipment establishes an association with the second AP.

The ReAssociation Request frame includes an address realm of the first AP. The address realm of the first AP carries a BSSID of the first AP. Therefore, on a network, a data packet sent to the first AP can be forwarded to the second AP according to the BSSID of the first AP, so as to reduce a packet loss during a process of handover between access points.

Optionally, in S2300, the terminal equipment sends an association request (Association Request) frame to the second AP, and receives an association response (Association Response) frame sent by the second AP.

S2400: The terminal equipment and the second AP jointly generate a key by using the Extensible Authentication Protocol ("EAP" for short).

It should be noted that in S2200-S2400, the terminal equipment always maintains a TCP/IP connection with the first AP, an IP connection of an upper-layer application of a user is not disconnected, and it is ensured that an upper-layer application service of the user is not terminated. Therefore, during an entire process, the user does not perceive the handover process, and when establishing the connection with the second AP, the terminal equipment does not need to re-apply for an IP address from the second AP, so that duration required by the handover process is reduced and user experience is improved.

Table 1 lists time required by each procedure and total time required by an entire handover process that are obtained when a method in the prior art is used for a handover between access points and when a method in this embodiment of the present invention is used for a handover between access points. It should be noted that data shown in Table 1 is a result of a single test, a distance between the terminal equipment and the dual-band radio access device when the test is being performed is less than 10 m, and there is no other interference in an environment.

TABLE 1

| Sequence number | Item | Prior art (s) | Present invention (s) |
|---|---|---|---|
| 1 | Scanning | 1.76 | 0.2 |
| 3 | Authentication and association | 0.22 | 0.22 |
| 4 | EPA authentication | 0.86 | 0.86 |
| 5 | IP address assignment | 1.58 | — |
|   | Total | 4.42 | 1.28 |

It can be learned from Table 1 that the method for handover between access points according to this embodiment of the present invention can reduce interruption duration during a handover process, thereby improving user experience.

Figure 4:
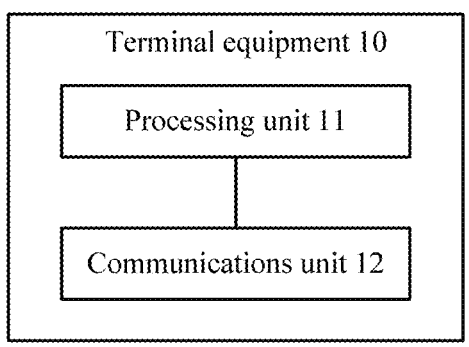
FIG. 4 is a schematic block diagram of terminal equipment according to an embodiment of the present invention.

The foregoing describes in detail the method for handover between access points according to the embodiments of the present invention with reference to FIG. 2 to FIG. 3, and the following describes in detail terminal equipment according to an embodiment of the present invention with reference to FIG. 4. As shown in FIG. 4, terminal equipment 10 includes: a processing unit 11, configured to: when the terminal equipment performs information transmission with a first access point AP on a first frequency band, determine whether the terminal equipment needs to establish a connection with a second AP, where an operating frequency band of the second AP is a second frequency band, where the processing unit 11 is further configured to: when determining that the terminal equipment needs to establish the connection with the second AP, determine whether the first AP and the second AP are corresponding to a same dual-band radio access device; and a communications unit 12, configured to: when the processing unit 11 determines that the first AP and the second AP are corresponding to the same dual-band radio access device, send a connection request to the second AP when maintaining a protocol layer connection with the first AP, where the connection request is used to request to establish a connection with the second AP, where the communications unit 12 is further configured to: if receiving a success message that is fed back according to the connection request and that is sent by the second AP, establish the connection with the second AP on the second frequency band.

Therefore, according to the terminal equipment in this embodiment of the present invention, when the first AP to which the terminal equipment is currently connected and the second AP to which the terminal equipment expects to be handed over are corresponding to the same dual-band radio access device, the terminal equipment establishes the connection with the second AP when maintaining the protocol layer connection with the first AP. In this case, during a process of handing over terminal equipment to an access point, an IP connection of an upper-layer application of a user is not removed, so that the user does not perceive the handover process. In addition, when the terminal equipment establishes the connection with the target AP, the target AP does not need to assign an IP address to the terminal equipment, so as to reduce duration required by the handover process, thereby improving user experience.

In this embodiment of the present invention, optionally, in the aspect of determining whether the first AP and the second AP are corresponding to a same dual-band radio access device, the processing unit 11 is specifically configured to determine, according to a relationship between a basic service set identifier BSSID of the first AP and a BSSID of the second AP, whether the first AP and the second AP are corresponding to the same dual-band radio access device, or determine, according to a relationship between a Media Access Control MAC address of a default gateway of the first AP and a MAC address of a default gateway of the second AP, whether the first AP and the second AP are corresponding to the same dual-band radio access device.

In this embodiment of the present invention, optionally, in the aspect of determining whether the terminal equipment needs to establish a connection with a second AP, the processing unit 11 is specifically configured to scan channels on the first frequency band and the second frequency band, and determine, according to a result of scanning the channels on the first frequency band and the second frequency band, whether the terminal equipment needs to establish the connection with the second AP.

In this embodiment of the present invention, optionally, in the aspect of scanning channels on the first frequency band and the second frequency band, the processing unit 11 is specifically configured to scan any channel of the channels on the first frequency band and the second frequency band, and when scanning of the any channel is completed, determine whether there is to-be-sent data. The communications unit 12 is specifically configured to: when the processing unit 11 determines that there is to-be-sent data, send the to-be-sent data by using the first frequency band. The processing unit 11 is specifically configured to: after the communications unit 12 sends the to-be-sent data by using the first frequency band, continue scanning another channel of the channels on the first frequency band and the second frequency band.

In this embodiment of the present invention, optionally, the processing unit 11 is further configured to determine a first channel and a second channel, where the first channel is an operating channel of the first AP on the first frequency band, and the second channel is an operating channel of the second AP on the second frequency band, and in the aspect of scanning channels on the first frequency band and the second frequency band, the processing unit 11 is specifically configured to scan the first channel and the second channel.

In this embodiment of the present invention, optionally, before the processing unit 11 determines whether the terminal equipment needs to establish the connection with the second AP, the communications unit 12 is further configured to store a first network configuration of the first AP and a second network configuration of the second AP, where the first network configuration includes the first channel, and the second network configuration includes the second channel; and in the aspect of determining a first channel and a second channel, the processing unit 12 is specifically configured to determine the first channel according to the first network configuration, and determine the second channel according to the second network configuration.

In this embodiment of the present invention, optionally, in the aspect of sending a connection request to the first AP, the communications unit 12 is specifically configured to send a reassociation request frame to the second AP, where the reassociation request frame carries the basic service set identifier BSSID of the first AP.

In this embodiment of the present invention, optionally, the first frequency band is 2.4 GHz, and the second frequency band is 5 GHz; or the first frequency band is 5 GHz, and the second frequency band is 2.4 GHz.

It should be understood that the terminal equipment 10 herein is embodied in a form of a functional unit. The term "unit" herein may refer to an application-specific integrated circuit ("ASIC" for short), an electronic circuit, a processor configured to execute one or more software or firmware programs (for example, a shared processor, a proprietary processor, or a group processor) and a memory, a merged logic circuit, and/or another appropriate component that supports a described function. In an optional example, a person skilled in the art may understand that the terminal equipment 10 may be configured to execute each process and/or step in the method 1000 and the method 2000 in the foregoing method embodiments. To avoid repetition, details are not described herein again.

Figure 5:
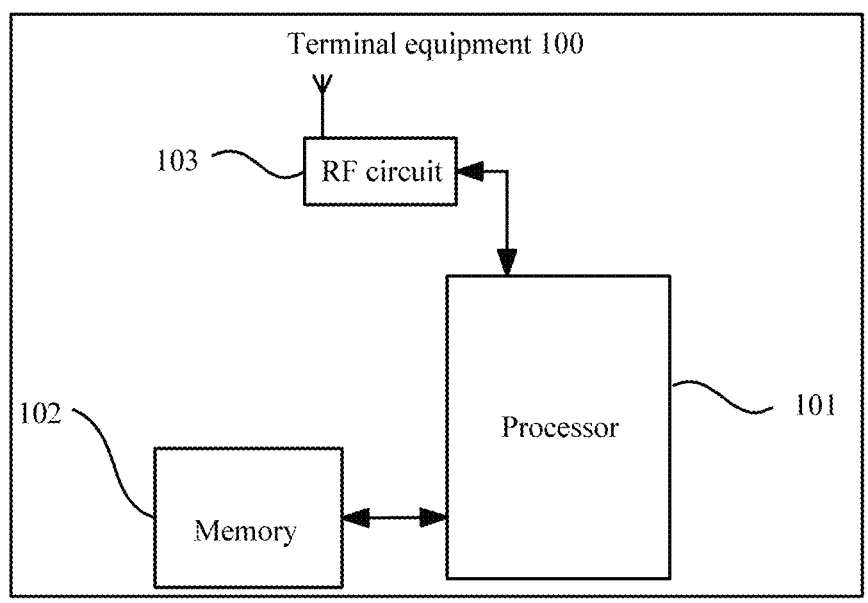
FIG. 5 is a schematic block diagram of terminal equipment according to another embodiment of the present invention.

As shown in FIG. 5, an embodiment of the present invention further provides terminal equipment 100. The terminal equipment 100 includes a processor 101, a memory 102, and a radio frequency ("RF" for short) circuit 103, where the RF circuit 103 may also be referred to as a transceiver. A person skilled in the art may understand that a structure of the terminal equipment shown in FIG. 5 does not constitute any limitation on the terminal equipment. The terminal equipment may include components more or fewer than those shown in the figure, or in the terminal equipment, some components are combined, some components are split, or the components are disposed differently.

The processor 101 is configured to: when the terminal equipment performs information transmission with a first access point AP on a first frequency band, determine whether the terminal equipment needs to establish a connection with a second AP, where an operating frequency band of the second AP is a second frequency band. The processor 101 is further configured to: when determining that the terminal equipment needs to establish the connection with the second AP, determine whether the first AP and the second AP are corresponding to a same dual-band radio access device. If the processor 101 determines that the first AP and the second AP are corresponding to the same dual-band radio access device, the RF circuit 103 sends a connection request to the second AP when maintaining a protocol layer connection with the first AP, where the connection request is used to request to establish a connection with the second AP. If the RF circuit 103 receives a success message that is fed back according to the connection request and that is sent by the second AP, the processor 101 establishes the connection with the second AP.

Therefore, according to the terminal equipment in this embodiment of the present invention, when the first AP to which the terminal equipment is currently connected and the second AP to which the terminal equipment expects to be handed over are corresponding to the same dual-band radio access device, the terminal equipment establishes the connection with the second AP when maintaining the protocol layer connection with the first AP. In this case, during a process of handing over terminal equipment to an access point, an IP connection of an upper-layer application of a user is not removed, so that the user does not perceive the handover process. In addition, when the terminal equipment establishes the connection with the target AP, the target AP does not need to assign an IP address to the terminal equipment, so as to reduce duration required by the handover process, thereby improving user experience.

It should be understood that, in this embodiment of the present invention, the processor 101 may be a central processing unit ("CPU" for short), or the processor 101 may be another general purpose processor, a digital signal processor (DSP), an application-specific integrated circuit (ASIC), a field programmable gate array (FPGA) or another programmable logic device, a discrete gate or transistor logic device, a discrete hardware assembly, or the like. The general purpose processor may be a microprocessor, or the processor may be any conventional processor or the like.

The memory 102 may be configured to store a software program and a module. The processor 101 runs the software program and the module stored in the memory 102, so as to execute various function applications of the terminal equipment 100 and implement data processing. The memory 102 may mainly include a program storage area and a data storage area. The program storage area may store an operating system, an application program required by at least one function (such as an audio playback function and an image playback function), and the like. The data storage area may store data (such as audio data and a phone book) that is created according to use of the terminal equipment 100, and the like. In addition, the memory 102 may include a high-speed random access memory, and may further include a nonvolatile memory, for example, at least one disk storage device, a flash memory device, or another volatile solid-state storage device.

The RF circuit 103 may be configured to receive and send information, or receive and send a signal in a call process, and in particular, after receiving downlink information from a base station, send the information to the processor 101 for processing, and in addition, send designed uplink data to the base station. Generally, the RF circuit 103 includes but is not limited to an antenna, at least one amplifier, a transceiver, a coupler, a low noise amplifier ("LNA" for short), a duplexer, and the like. In addition, the RF circuit 103 may further communicate with a network and another device by means of wireless communication. Any communications standard or protocol may be used for the wireless communication, including but not limited to Global System for Mobile Communications ("GSM" for short), General Packet Radio Service ("GPRS" for short), a Code Division Multiple Access ("CDMA" for short) system, a Wideband Code Division Multiple Access ("WCDMA" for short) system, a Long Term Evolution ("LTE" for short) system, an email, a short message service ("SMS" for short), and the like.

During an implementation process, the steps of the foregoing method may be implemented by an integrated logic circuit of hardware in the processor 101 or by using an instruction in a form of software. The steps of the methods disclosed with reference to the embodiments of the present invention may be directly executed by a hardware processor, or may be executed by a combination of hardware and a software module in a processor. The software module may be located in a storage medium that is mature in the art, such as a random access memory, a flash memory, a read-only memory, a programmable read-only memory or an electrically erasable programmable memory, or a register. The storage medium is located in the memory 102, and the processor 101 reads information in the memory 102 and completes the steps of the foregoing methods in combination with hardware of the processor 101. To avoid repetition, details are not described herein again.

Optionally, in an embodiment, in the aspect of determining whether the first AP and the second AP are corresponding to a same dual-band radio access device, the processor 101 is specifically configured to determine, according to a relationship between a basic service set identifier BSSID of the first AP and a BSSID of the second AP, whether the first AP and the second AP are corresponding to the same dual-band radio access device; or determine, according to a relationship between a Media Access Control MAC address of a default gateway of the first AP and a MAC address of a default gateway of the second AP, whether the first AP and the second AP are corresponding to the same dual-band radio access device.

Optionally, in an embodiment, in the aspect of determining whether the terminal equipment needs to establish a connection with a second AP, the processor 101 is specifically configured to scan channels on the first frequency band and the second frequency band, and determine, according to a result of scanning the channels on the first frequency band and the second frequency band, whether the terminal equipment needs to establish the connection with the second AP.

Optionally, in an embodiment, in the aspect of scanning channels on the first frequency band and the second frequency band, the processor 101 is specifically configured to scan any channel of the channels on the first frequency band and the second frequency band, and when scanning of the any channel is completed, determine whether there is to-be-sent data. When the processor 101 determines that there is to-be-sent data, the RF circuit 103 sends the to-be-sent data by using the first frequency band. After the RF circuit 103 sends the to-be-sent data by using the first frequency band, the processor 101 continues scanning another channel of the channels on the first frequency band and the second frequency band.

Optionally, in an embodiment, the processor 101 is further configured to determine a first channel and a second channel, where the first channel is an operating channel of the first AP on the first frequency band, and the second channel is an operating channel of the second AP on the second frequency band; and in the aspect of scanning channels on the first frequency band and the second frequency band, the processor 101 is specifically configured to scan the first channel and the second channel.

Optionally, in an embodiment, before the processor 101 determines whether the terminal equipment needs to establish the connection with the second AP, the memory 102 is further configured to store a first network configuration of the first AP and a second network configuration of the second AP, where the first network configuration includes the first channel, and the second network configuration includes the second channel; and in the aspect of determining a first channel and a second channel, the processor 101 is specifically configured to determine the first channel according to the first network configuration, and determine the second channel according to the second network configuration.

Optionally, in an embodiment, in the aspect of sending a connection request to the second AP, the RF circuit 103 is specifically configured to send a reassociation request frame to the second AP, where the reassociation request frame carries the BSSID of the first AP.

Optionally, in an embodiment, the first frequency band is 2.4 GHz, and the second frequency band is 5 GHz; or the first frequency band is 5 GHz, and the second frequency band is 2.4 GHz.

It should be understood that the terminal equipment 100 according to this embodiment of the present invention may be corresponding to the terminal equipment 10 in the embodiment of the present invention, and may be corresponding to the terminal equipment that executes the method 1000 according to the embodiment of the present invention, and the foregoing and other operations and/or functions of each module in the terminal equipment 100 are intended to implement corresponding processes that are corresponding to the terminal equipment in the methods in FIG. 2 and FIG. 3. For brevity, details are not described herein again.

Therefore, according to the terminal equipment in this embodiment of the present invention, when the first AP to which the terminal equipment is currently connected and the second AP to which the terminal equipment expects to be handed over are corresponding to the same dual-band radio access device, the terminal equipment establishes the connection with the second AP when maintaining the protocol layer connection with the first AP. In this case, during a process of handing over terminal equipment to an access point, an IP connection of an upper-layer application of a user is not removed, so that the user does not perceive the handover process. In addition, when the terminal equipment establishes the connection with the target AP, the target AP does not need to assign an IP address to the terminal equipment, so as to reduce duration required by the handover process, thereby improving user experience.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    when terminal equipment performs information transmission with a first access point (AP) on a first frequency band, determining, by the terminal equipment, whether the terminal equipment is to establish a connection with a second AP, wherein an operating frequency band of the second AP is a second frequency band, and wherein the first AP is different from the second AP;
    when the terminal equipment determines that the terminal equipment is to establish the connection with the second AP, determining, by the terminal equipment, whether the first AP and the second AP correspond to a same dual-band radio access device;
    when the terminal equipment determines that the first AP and the second AP correspond to the same dual-band radio access device, sending, by the terminal equipment using the second frequency band, a connection request to the second AP when maintaining a protocol layer connection with the first AP, wherein the connection request requests to establish the connection with the second AP; and
    when the terminal equipment receives a success message that is fed back according to the connection request and that is sent by the second AP, establishing, by the terminal equipment, the connection with the second AP.

2. The method according to claim 1, wherein determining whether the first AP and the second AP correspond to the same dual-band radio access device comprises:
    determining, by the terminal equipment according to a relationship between a first basic service set identifier (BSSID) of the first AP and a second BSSID of the second AP, whether the first AP and the second AP correspond to the same dual-band radio access device.

3. The method according to claim 1, wherein determining whether the terminal equipment is to establish the connection with the second AP comprises:
    scanning, by the terminal equipment, at least one channel of the first frequency band or of the second frequency band; and
    determining, by the terminal equipment according to a result of scanning the at least one channel of the first frequency band or of the second frequency band, whether the terminal equipment is to establish the connection with the second AP.

4. The method according to claim 3, wherein scanning the at least one channel of the first frequency band or of the second frequency band comprises:
    scanning, by the terminal equipment, a channel of the at least one channel of the first frequency band or of the second frequency band;
    when the terminal equipment completes scanning of the channel of the at least one channel, determining, by the terminal equipment, whether the terminal equipment is to perform a data transmission, wherein performing the data transmission comprises receiving data from the first AP or sending the data to the first AP;
    when the terminal equipment determines that the terminal equipment is to perform the data transmission, performing, by the terminal equipment, the data transmission using the first frequency band; and
    after the terminal equipment performs the data transmission using the first frequency band, continuing scanning, by the terminal equipment, another channel of the at least one channel of the first frequency band or of the second frequency band.

5. The method according to claim 3, further comprising:
    determining, by the terminal equipment, a first channel and a second channel, wherein the first channel is an operating channel of the first AP on the first frequency band, and the second channel is an operating channel of the second AP on the second frequency band; and
    wherein scanning the at least one channel of the first frequency band or of the second frequency band comprises:

scanning, by the terminal equipment, the first channel and the second channel.

6. The method according to claim 5, further comprising:
storing, by the terminal equipment, before determining whether the terminal equipment is to establish the connection with the second AP, a first network configuration of the first AP and a second network configuration of the second AP, wherein the first network configuration comprises the first channel, and the second network configuration comprises the second channel; and
wherein determining the first channel and the second channel comprises:
determining, by the terminal equipment, the first channel according to the first network configuration; and
determining, by the terminal equipment, the second channel according to the second network configuration.

7. The method according to claim 1, wherein sending the connection request comprises:
sending a reassociation request frame to the second AP, wherein the reassociation request frame carries a basic service set identifier (BSSID) of the first AP.

8. The method according to claim 1, wherein the first frequency band is 2.4 GHz, and the second frequency band is 5 GHz; or wherein the first frequency band is 5 GHz, and the second frequency band is 2.4 GHz.

9. The method according to claim 1, wherein determining whether the first AP and the second AP correspond to the same dual-band radio access device comprises:
determining, by the terminal equipment according to a relationship between a first Media Access Control (MAC) address of a first default gateway of the first AP and a second MAC address of a second default gateway of the second AP, whether the first AP and the second AP correspond to the same dual-band radio access device.

10. A terminal equipment comprising:
a processor;
a non-transitory memory storage comprising instructions;
a transceiver configured to receive and send messages under control of the processor, implementing communication between the terminal equipment and an access point (AP);
the processor, the non-transitory memory storage, and the transceiver being coupled to a bus system of the terminal equipment; and
wherein the processor executes the instructions to perform operations comprising:
when terminal equipment performs information transmission with a first AP on a first frequency band, determining whether the terminal equipment is to establish a connection with a second AP, wherein an operating frequency band of the second AP is a second frequency band, and wherein the first AP is different from the second AP;
determining whether the first AP and the second AP correspond to a same dual-band radio access device;
when the terminal equipment determines that the first AP and the second AP correspond to the same dual-band radio access device, sending, using the second frequency band, a connection request to the second AP when maintaining a protocol layer connection with the first AP, wherein the connection request is requests to establish the connection with the second AP; and
when the terminal equipment receives a success message that is fed back according to the connection request and that is sent by the second AP, establishing the connection with the second AP.

11. The terminal equipment according to claim 10, wherein the instructions for determining whether the terminal equipment is to establish the connection with the second AP comprise further instructions for:
instructing the terminal equipment to scan at least one channel of the first frequency band or of the second frequency band; and
determine, according to a result of scanning the at least one channel of the first frequency band or of the second frequency band, whether the terminal equipment is to establish the connection with the second AP.

12. The terminal equipment according to claim 11, wherein the instructions for scanning the at least one channel of the first frequency band or of the second frequency band comprise further instructions for:
instructing the terminal equipment to scan a channel of the at least one channel of the first frequency band or of the second frequency band;
when the terminal equipment completes scanning of the channel of the at least one channel, determining whether the terminal equipment is to perform a data transmission, wherein performing the data transmission comprises receiving data from the first AP or sending the data to the first AP;
when having determined to perform the data transmission, performing the data transmission using the first frequency band; and
after performing the data transmission using the first frequency band, instructing the terminal equipment to continue scanning another channel of the at least one channel of the first frequency band or of the second frequency band.

13. The terminal equipment according to claim 11, wherein the processor executes further instructions to perform further operations comprising:
determining a first channel and a second channel, wherein the first channel is an operating channel of the first AP on the first frequency band, and the second channel is an operating channel of the second AP on the second frequency band.

14. The terminal equipment according to claim 13, wherein the instructions for scanning the at least one channel of the first frequency band or of the second frequency band comprise further instructions for instructing the terminal equipment to scan the first channel and the second channel.

15. The terminal equipment according to claim 13, wherein the processor executes further instructions to perform further operations comprising:
instructing the terminal equipment, before determining whether the terminal equipment is to establish the connection with the second AP, to store a first network configuration of the first AP and a second network configuration of the second AP, wherein the first network configuration comprises the first channel, and the second network configuration comprises the second channel.

16. The terminal equipment according to claim 15, wherein the instructions for determining the first channel and the second channel comprise further instructions for:
determining the first channel according to the first network configuration; and
determining the second channel according to the second network configuration.

17. The terminal equipment according to claim 10, wherein the instructions for sending the connection request comprise further instructions for sending a reassociation request frame to the second AP, wherein the reassociation request frame carries a basic service set identifier (BSSID) of the first AP.

18. The terminal equipment according to claim 10, wherein the instructions for determining whether the first AP and the second AP correspond to the same dual-band radio access device comprise further instructions for:
   determining, according to a relationship between a first basic service set identifier (BSSID) of the first AP and a second BSSID of the second AP, whether the first AP and the second AP correspond to the same dual-band radio access device.

19. The terminal equipment according to claim 10, wherein the instructions for determining whether the first AP and the second AP correspond to the same dual-band radio access device comprise further instructions for:
   determining, according to a relationship between a first Media Access Control (MAC) address of a first default gateway of the first AP and a second MAC address of a second default gateway of the second AP, whether the first AP and the second AP correspond to the same dual-band radio access device.

20. The terminal equipment according to claim 10, wherein the first frequency band is 2.4 GHz, and the second frequency band is 5 GHz, or wherein the first frequency band is 5 GHz, and the second frequency band is 2.4 GHz.

\* \* \* \* \*

UNITED STATES PATENT AND TRADEMARK OFFICE
CERTIFICATE OF CORRECTION

PATENT NO. : 10,880,795 B2
APPLICATION NO. : 16/305824
DATED : December 29, 2020
INVENTOR(S) : Liu et al.

Page 1 of 1

It is certified that error appears in the above-identified patent and that said Letters Patent is hereby corrected as shown below:

In the Claims

In Column 19, Line 66, Claim 10, delete "request is requests" and insert --request requests--.

Signed and Sealed this
Eleventh Day of May, 2021

Drew Hirshfeld
*Performing the Functions and Duties of the
Under Secretary of Commerce for Intellectual Property and
Director of the United States Patent and Trademark Office*